(12) United States Patent
De Jesus

(10) Patent No.: US 11,563,759 B2
(45) Date of Patent: Jan. 24, 2023

(54) METHODS AND SYSTEMS FOR CYBER-MONITORING AND VISUALLY DEPICTING CYBER-ACTIVITIES

(71) Applicant: Cyber Defence QCD Corporation, Ottawa (CA)

(72) Inventor: Tiago Alves De Jesus, Ottawa (CA)

(73) Assignee: Cyber Defence QCD Corporation, Ottawa (CA)

( * ) Notice: Subject to any disclaimer, the term of this patent is extended or adjusted under 35 U.S.C. 154(b) by 316 days.

(21) Appl. No.: 16/287,345

(22) Filed: Feb. 27, 2019

(65) Prior Publication Data

US 2019/0268362 A1 Aug. 29, 2019

Related U.S. Application Data

(60) Provisional application No. 62/636,368, filed on Feb. 28, 2018, provisional application No. 62/696,896, filed on Jul. 12, 2018.

(51) Int. Cl.
*G06F 3/048* (2013.01)
*H04L 9/40* (2022.01)
*H04L 67/50* (2022.01)

(52) U.S. Cl.
CPC .......... *H04L 63/1425* (2013.01); *G06F 3/048* (2013.01); *H04L 67/535* (2022.05)

(58) Field of Classification Search
CPC ........................ H04L 63/1425; H04L 67/22
See application file for complete search history.

(56) References Cited

U.S. PATENT DOCUMENTS

| | | | |
|---|---|---|---|
| 10,296,180 B1 * | 5/2019 | Young | G06F 3/0481 |
| 2011/0167343 A1 * | 7/2011 | Wright | H04L 43/0811 |
| | | | 715/764 |
| 2013/0311832 A1 * | 11/2013 | Lad | H04L 43/0852 |
| | | | 714/37 |
| 2015/0161394 A1 | 6/2015 | Ferragut et al. | |

(Continued)

FOREIGN PATENT DOCUMENTS

| | | |
|---|---|---|
| WO | 2017037444 | 3/2017 |
| WO | 2017180057 | 10/2017 |

OTHER PUBLICATIONS

International Search Report for PCT/CA2019/050233 dated May 16, 2019.

*Primary Examiner* — Xuyang Xia
(74) *Attorney, Agent, or Firm* — Gottlieb, Rackman & Reisman

(57) ABSTRACT

The present invention relates to methods and systems for cyber-monitoring and visually depicting cyber-activities. In certain embodiments, there is provided a method for visually depicting cyber-activities, entities, and/or entity-relations, said method comprising: displaying on a graphical user interface multiple visual representations comprising graphical components of one or more elements in a chronological order, using a time based tracking model, wherein each of said one or more elements is selected from a cyber-activity, entity, and entity-relation; wherein each of said visual representations represents a different level of a granularity and/or hierarchy; b) optionally displaying, optionally in response to a user action, a link to a selected element in each of said multiple visual representations.

13 Claims, 12 Drawing Sheets

(56) References Cited

U.S. PATENT DOCUMENTS

| | | | |
|---|---|---|---|
| 2016/0119192 A1* | 4/2016 | Tanoue | H04L 41/0853 |
| | | | 715/735 |
| 2017/0063897 A1 | 3/2017 | Muddu et al. | |
| 2017/0063912 A1 | 3/2017 | Muddu et al. | |
| 2018/0046620 A1* | 2/2018 | Sasaki | G06F 3/0482 |
| 2018/0341394 A1* | 11/2018 | Sangli | G06F 3/0481 |
| 2019/0052664 A1* | 2/2019 | Kibler | G06F 11/301 |
| 2019/0081971 A1* | 3/2019 | Jones | G06F 21/552 |

\* cited by examiner

METHODS AND SYSTEMS FOR CYBER-MONITORING AND VISUALLY DEPICTING CYBER-ACTIVITIES

FIELD OF THE INVENTION

The present invention pertains to the field of network management. In particular, the present invention relates to systems and methods for the monitoring, tracking, and visualizing cyber-activities.

BACKGROUND OF THE INVENTION

Computers and computer networks have become an integral part of modern society. As reliance on computers and computer networks has grown the impact of failure of computer and computer networks has also grown. Moreover, anomalous cyber-activities, such as the execution of unauthorised and/or malicious software, are a major concern for both organizations and individuals, which can result in significant damages. Anomalous cyber-activities can be indicative of not only malicious cyber-activities but also human error, equipment failures, software malfunction, accidents, among others. Immediate damages may include but are not limited to data deletion and/or corruption, data theft, release of confidential information to the public, and/or system/network downtime. Subsequent damages may include but are not limited to financial losses, social and/or political repercussion, business interruption, loss of competitive advantage and/or loss of intellectual property. Accordingly, monitoring of computers and computer networks is of great importance.

The complexity and volume of raw data generated from monitoring events streams in a computer and computer network can render the identification of anomalous cyber-activities from normal cyber-activities challenging.

SUMMARY OF THE INVENTION

An object of the present invention is to provide systems and methods for the monitoring, tracking, and visualization of cyber-activities, entities, and entity-relations derived from raw event stream data. In accordance with an aspect of the present invention, there is provided methods for visually depicting cyber-activities, entities, and entity-relations, said method comprising: a) displaying on a graphical user interface multiple visual representations comprising graphical components of one or more cyber-activity, entity, and entity-relation in a chronological order, using a time based tracking model. Each of the elements, which can either be a cyber-activity, an entity, or an entity-relation, is displayed as a graphical representation, wherein each of said visual representations can represents a different level of a granularity and/or hierarchy; b) optionally displaying, optionally in response to a user action, a link to a selected element in each of said multiple visual representations; and c) optionally displaying, optionally in response to a user action, on said graphical user interface, a graphical representation(s) of a tree(s) and/or stack associated with one or more of said elements, which can either be cyber-activities, entities, and/or entity-relations.

In another aspect of the present invention, there is provided a method for visually depicting cyber-activities, entities, and/or entity-relations, said method comprising: a) displaying on a graphical user interface multiple visual representations comprising graphical components of one or more elements in a chronological order, using a time based tracking model, wherein each of said one or more elements is selected from a cyber-activity, entity, and entity-relation; wherein each of said visual representations represents a different level of a granularity and/or hierarchy; b) optionally displaying, optionally in response to a user action, a link to a selected element in each of said multiple visual representations. In certain embodiments, each visual presentation of said multiple visual presentations is a tree(s) and/or stack associated with one or more of said elements. In certain embodiments, the method further comprises displaying, optionally in response to a user action, a link to a selected element in each of said multiple visual representations.

In another aspect of the present invention, there is provided a method of visually depicting cyber-activities, said method comprising: (a) extracting and/or building one or more entities and one or more entity-relations from tracked cyber-activities from event stream(s), wherein each of said entity is representative component of a particular cyber-activity; and (b) visualizing one or more cyber-activities, said one or more entities and one or more entity-relations on a graphical user interface. In certain embodiments, step (a) comprises: (i) tracking said cyber-activities derived from event stream(s); (ii) selecting entities from said cyber-activity(ies) and (iii) selecting entity-relations tracking model. In certain embodiments, step (b) comprises (i) displaying on a graphical user interface multiple visual representations comprising graphical representations of said one or more entities in a chronological order, using a time based tracking model; wherein each of said visual representations represents a different level of a granularity and/or hierarchy; and ii) optionally displaying, optionally in response to a user action, a link to a selected entity in each of said multiple visual representations.

BRIEF DESCRIPTION OF THE FIGURES

In FIG. 9, individual occurrences of cyber-activities are ordered on a "Universal Timeline", attached to the 'root' entity program image 'cmd.exe' represented by the black shell icon, which represents the cyber-activities related to a specific occurrence of the execution of the program image 'cmd.exe'. FIGS. 10 and 11, are entity-relations ordered on a "Universal Timeline", attached to the 'root' entity program image 'cmd.exe' represented by the black shell icon, which represent a statistical summary of the underlying cyber-activities with the number of occurrences for each specific entity-relations represented by a single number at the top right or at the bottom of the iconographic representation of the entity.

In FIG. 12, the visualization represents the tracking of the deployment of a patch across multiple organizations and devices. Each connector from a device to the hash in questions provides visual confirmation that the patch has been successfully implemented and that the hash has been executed at least once of the device. In FIG. 13, the visualization represents the tracking of a known malicious hash across multiple devices affecting multiple organizations. The distinction between the two patterns can be visually recognised.

In FIG. 14, there is a process entity stack based on process PI Ds for various types of entity program images. Each cell in the PID stack corresponds to a specific occurrence of the execution of the underlying program image. If a user 'integrates' over all PI Ds the entity-relations 'image-PID' the user obtains a statistical representation of the behavior of each program image 'integrated' over a set of independent execution occurrences. In particular, if the user 'integrates' over all of the entity-relations 'image-PID' the user obtains the program entity stack found in FIG. 15.

DETAILED DESCRIPTION OF THE INVENTION

Figure 1:
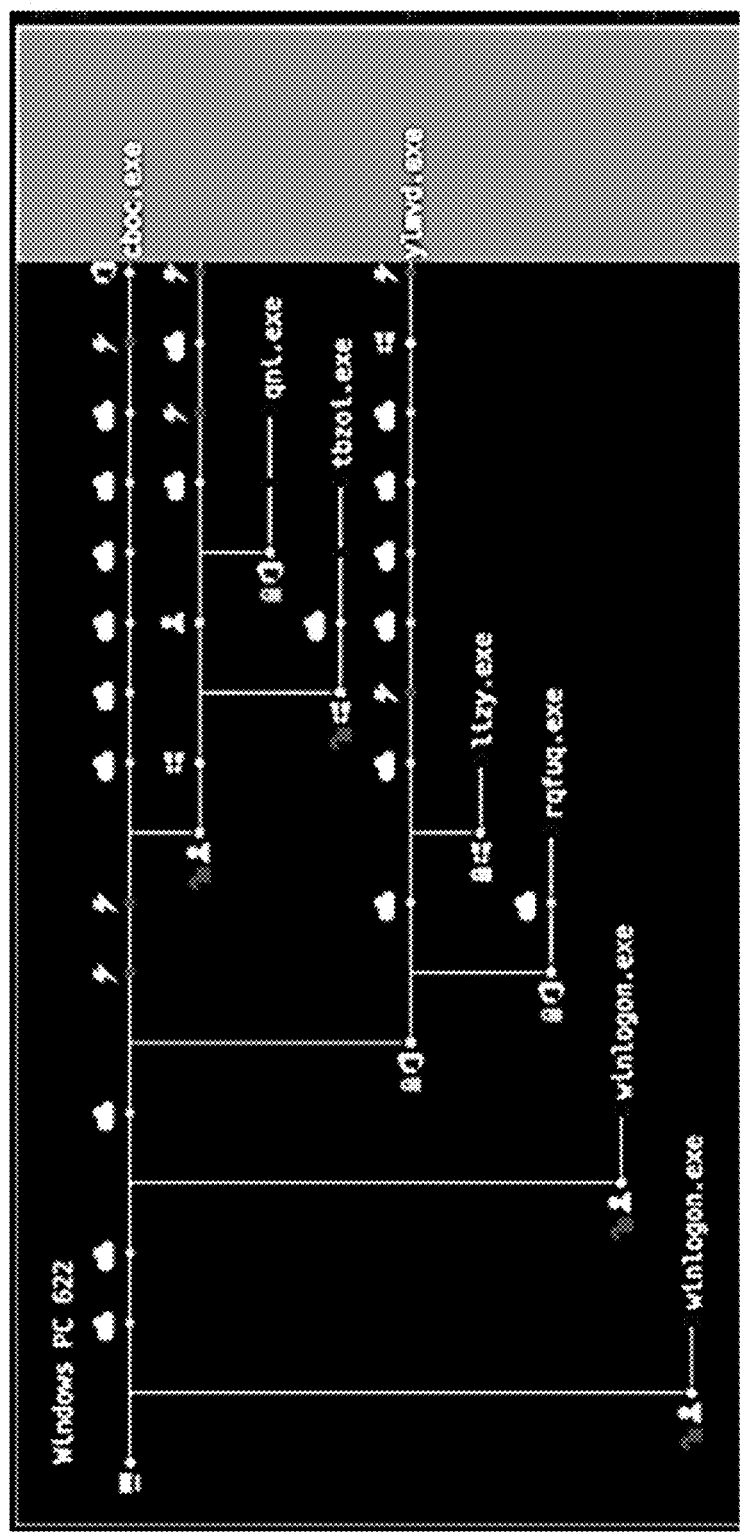
FIG. 1 provides an illustration of a visual representation of cyber-monitoring of an embodiment of the present invention. In this embodiment, a horizontal line/bar representing time processing from left to right is provided with datapoints representing tracked entities/activities in chronologically ordered on the line. In this non-limiting example, process level activity is visualized and a timeline is created using unique process identifiers as the tracking entity for the visual representation. In this example, branches providing further details are displayed.
Figure 2:
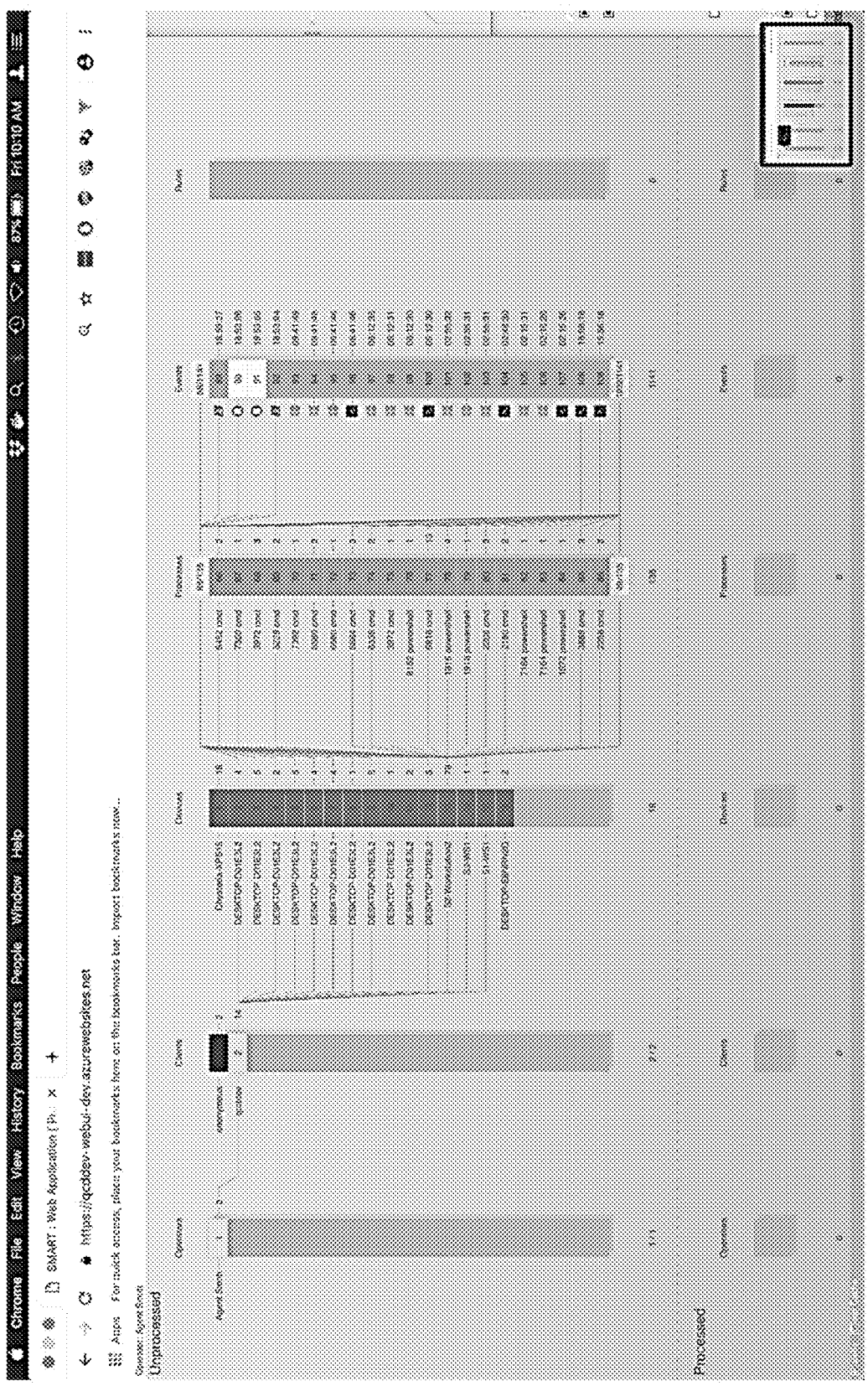
FIG. 2 illustrates an embodiment of the present invention which depicts cyber-monitoring at multiple levels of granularity and at various stages of analysis. In this embodiment, the levels of granularity include operators, clients, devices, processes and events. Each level of granularity is presented as a vertical stack with each block representing an entity/activity. A link/pathway following the activity/entity though the various granularity stacks is also illustrated. In this embodiment, the top panel illustrates unprocessed entities and the bottom panel illustrates processed entities that require further analysis. A stack visually depicting rules is also included in this embodiment. This form of representation may be used to represent any type of entity including process, domain, user, logon ID.
Figure 3:
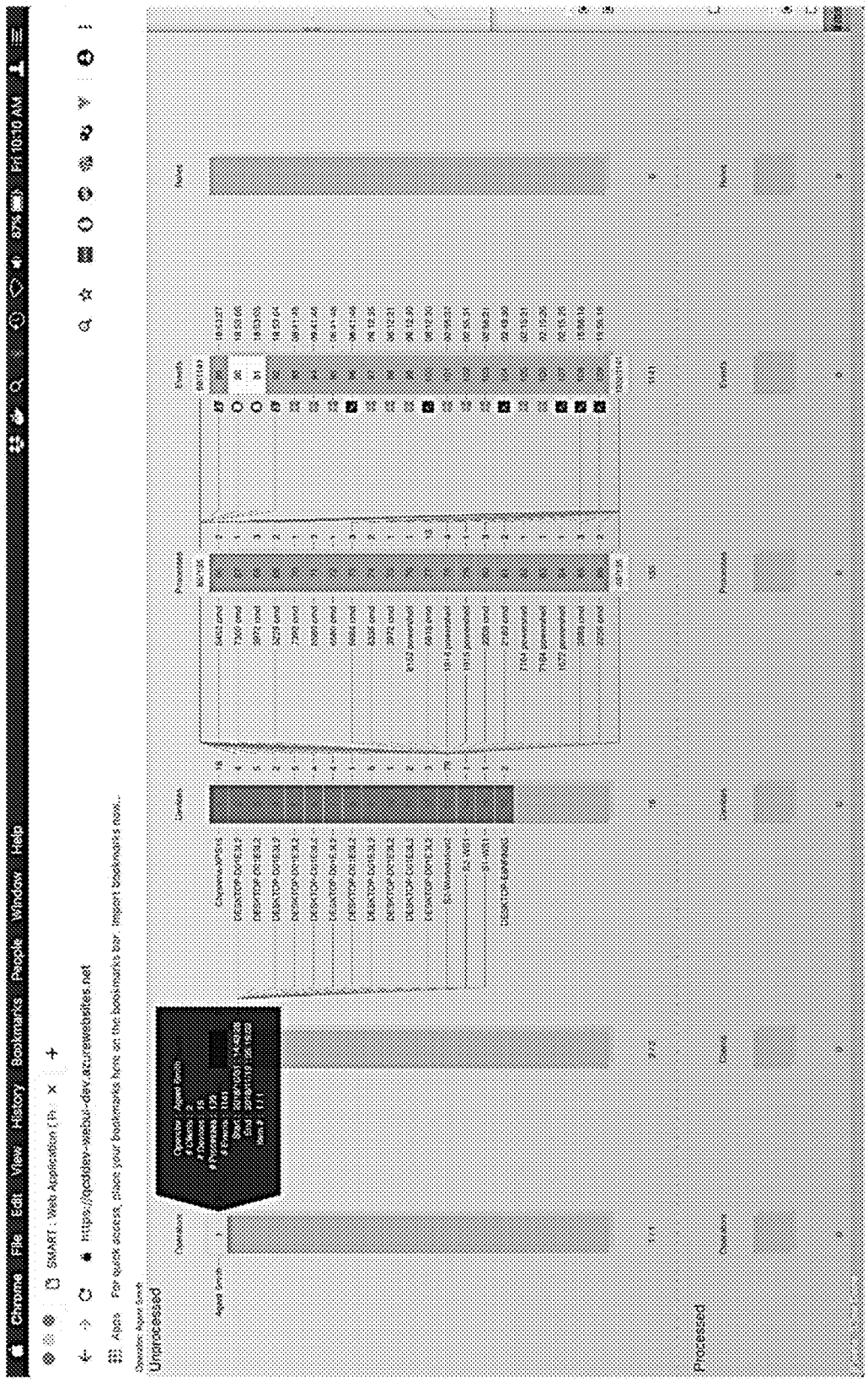
FIG. 3 illustrates the embodiment described in FIG. 2 but further illustrates a text box which popped up in response to user action which provides further details.
Figure 4:
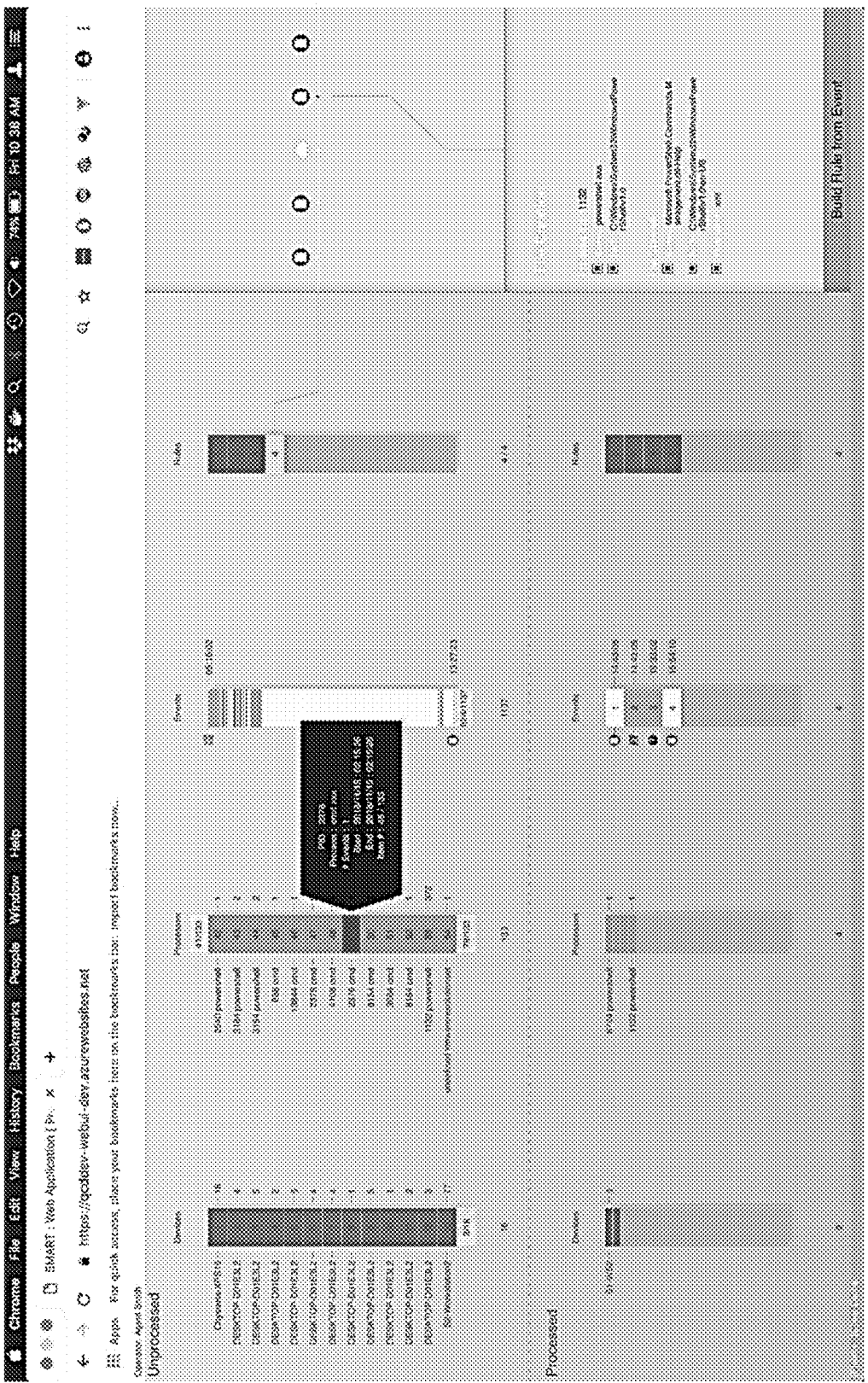
FIG. 4 illustrates a multiple panel GUI which includes a panel visually depicting unprocessed entities as stacks at various levels of granularity; a panel visual depicting processed entities; a panel providing a detailed context tree of a particular entity and a panel for rule building. Also illustrated is a text box which popped up in response to user action which provides further details.
Figure 5:
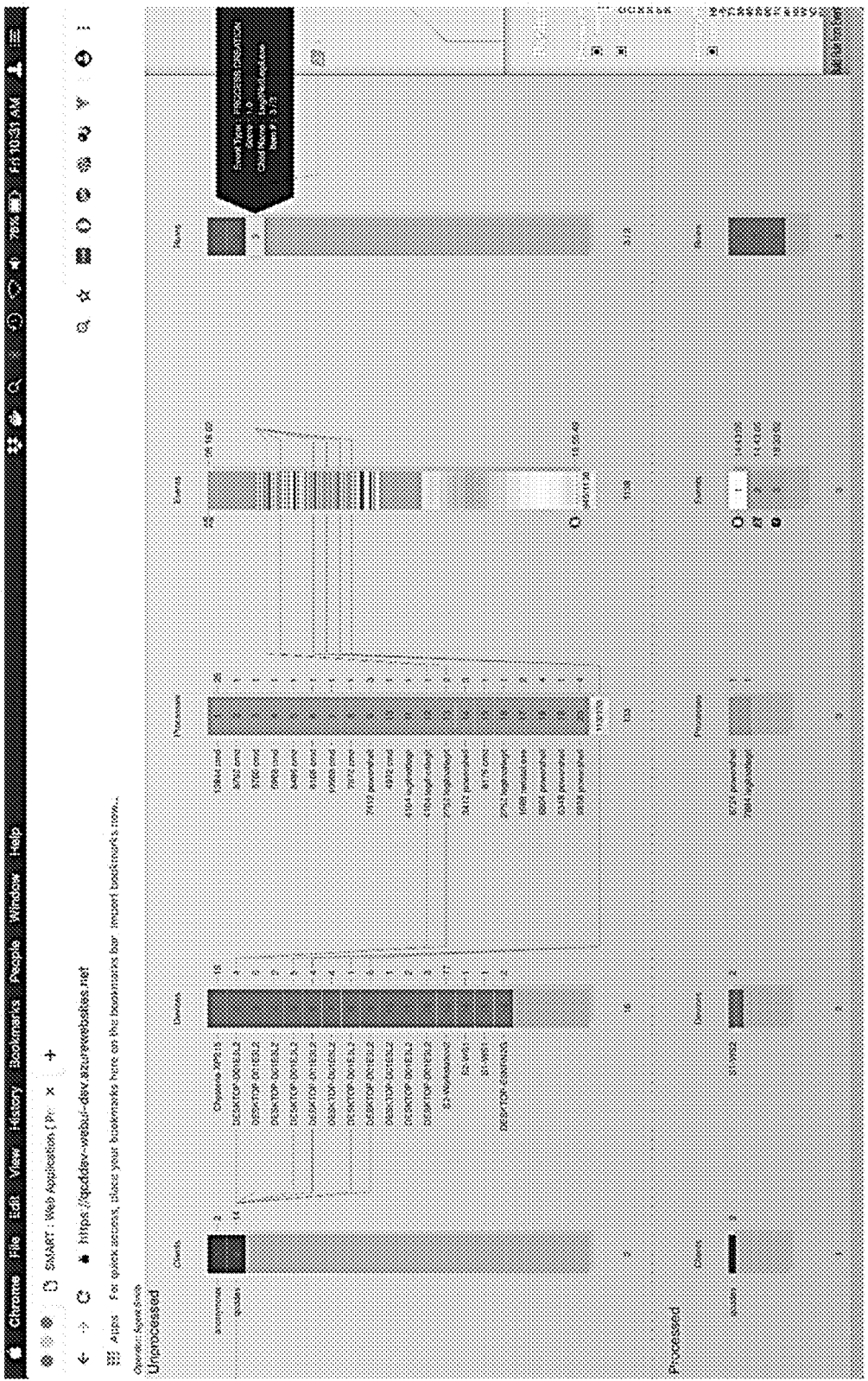
FIG. 5 illustrates an embodiment of the present invention which depicts cyber-monitoring at multiple levels of granularity and at various stages of analysis. In this embodiment, the levels of granularity include operators, clients, devices, processes and events. Each level of granularity is presented as a vertical stack with each block representing an entity/activity. A link/pathway following the entity though the various granularity stacks is also illustrated. In this embodiment, the top panel illustrates unprocessed entity/activity and the bottom panel illustrates processed entities that require further analysis. A stack visually depicting rules is also included in this embodiment. Also illustrated is a text box which popped up in response to user action which provides further details with respect to a particular rule.
Figure 6:
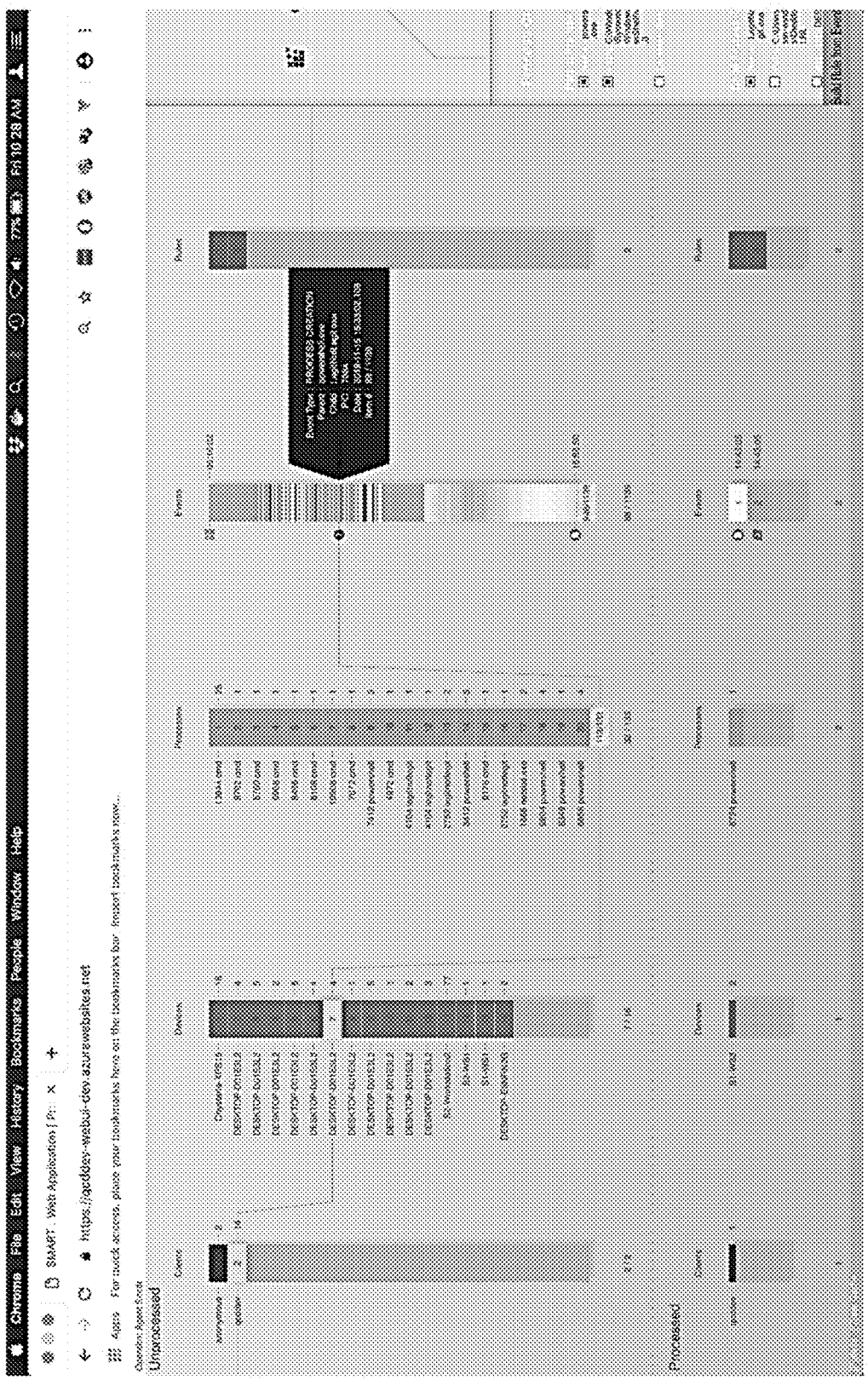
FIG. 6 illustrates an embodiment of the present invention which depicts cyber-monitoring at multiple levels of granularity and at various stages of analysis. In this embodiment, the levels of granularity include operators, clients, devices, processes and events. Each level of granularity is presented as a vertical stack with each block representing an entity/activity. A link/pathway following the entity though the various granularity stacks is also illustrated. In this embodiment, the top panel illustrates unprocessed entities/activities and the bottom panel illustrates processed entities/activities that require further analysis. A stack visually depicting rules is also included in this embodiment. Also illustrated is a text box which popped up in response to user action which provides further details.
Figure 7:
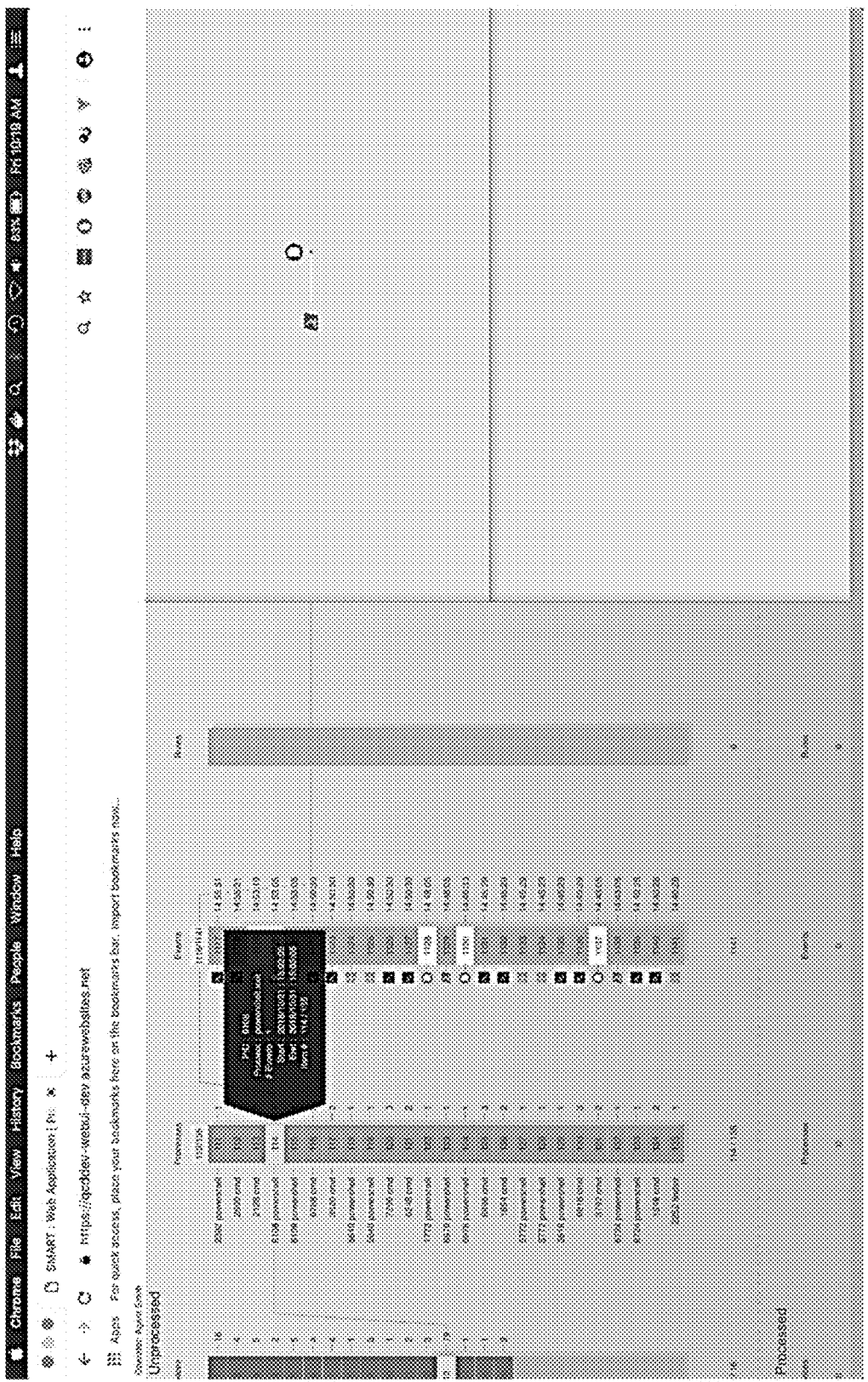
FIG. 7 provides details an example of the panel providing the tree associated with a particular entity.
Figure 8:
FIG. 8 illustrates an embodiment of the present invention which depicts cyber-monitoring at multiple levels of granularity and at various stages of analysis. In this embodiment, the levels of granularity include operators, clients, devices, processes and events. Each level of granularity is presented as a vertical stack with each block representing an entity/activity. A link/pathway following the entity/activity though the various granularity stacks is also illustrated. In this embodiment, the top panel illustrates unprocessed entities and the bottom panel illustrates processed entities that require further analysis. A stack visually depicting rules is also included in this embodiment.
Figure 9:
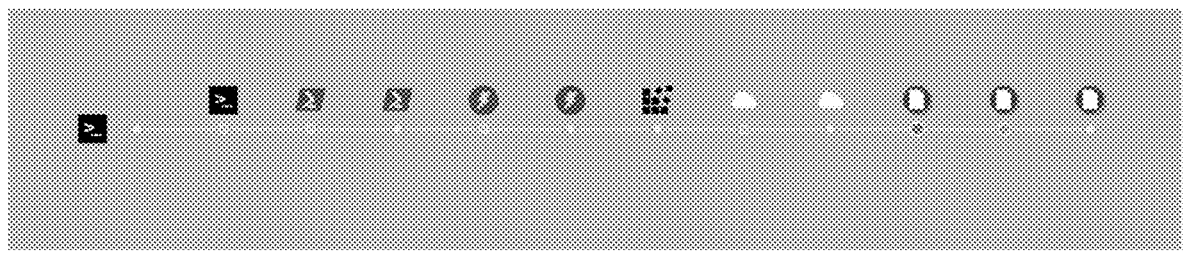
FIGS. 9, 10 and 11, illustrate examples of a time-based sequence representation of cyber-activities or entities and entity-relations.
Figure 10:
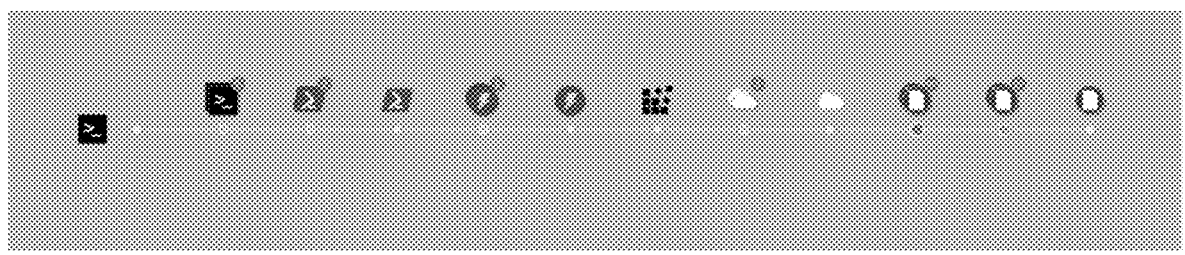
Figure 11:
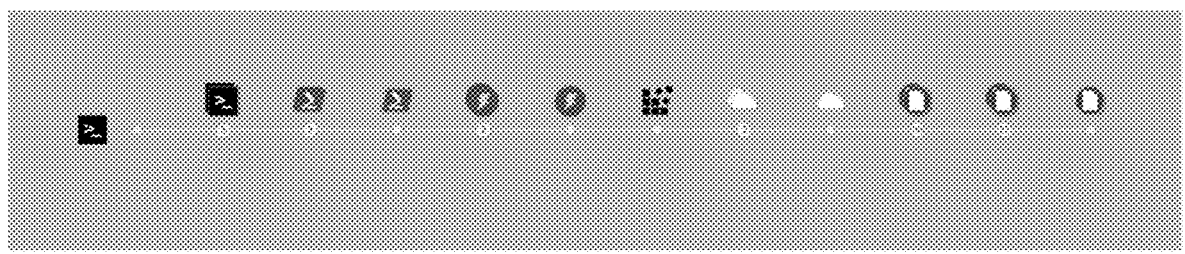
Figure 12:
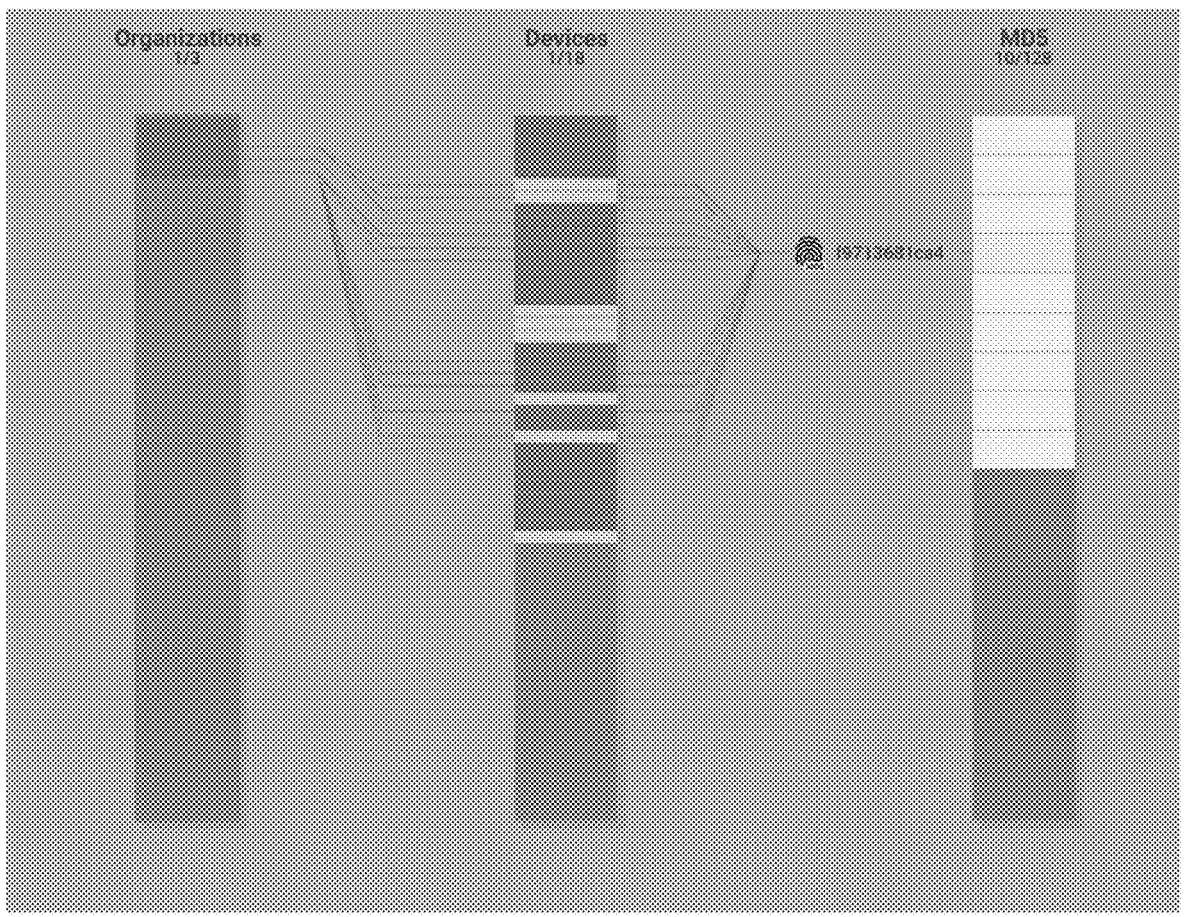
FIGS. 12 and 13, illustrate a stack representation for the hash based entity 'MD5'.
Figure 13:
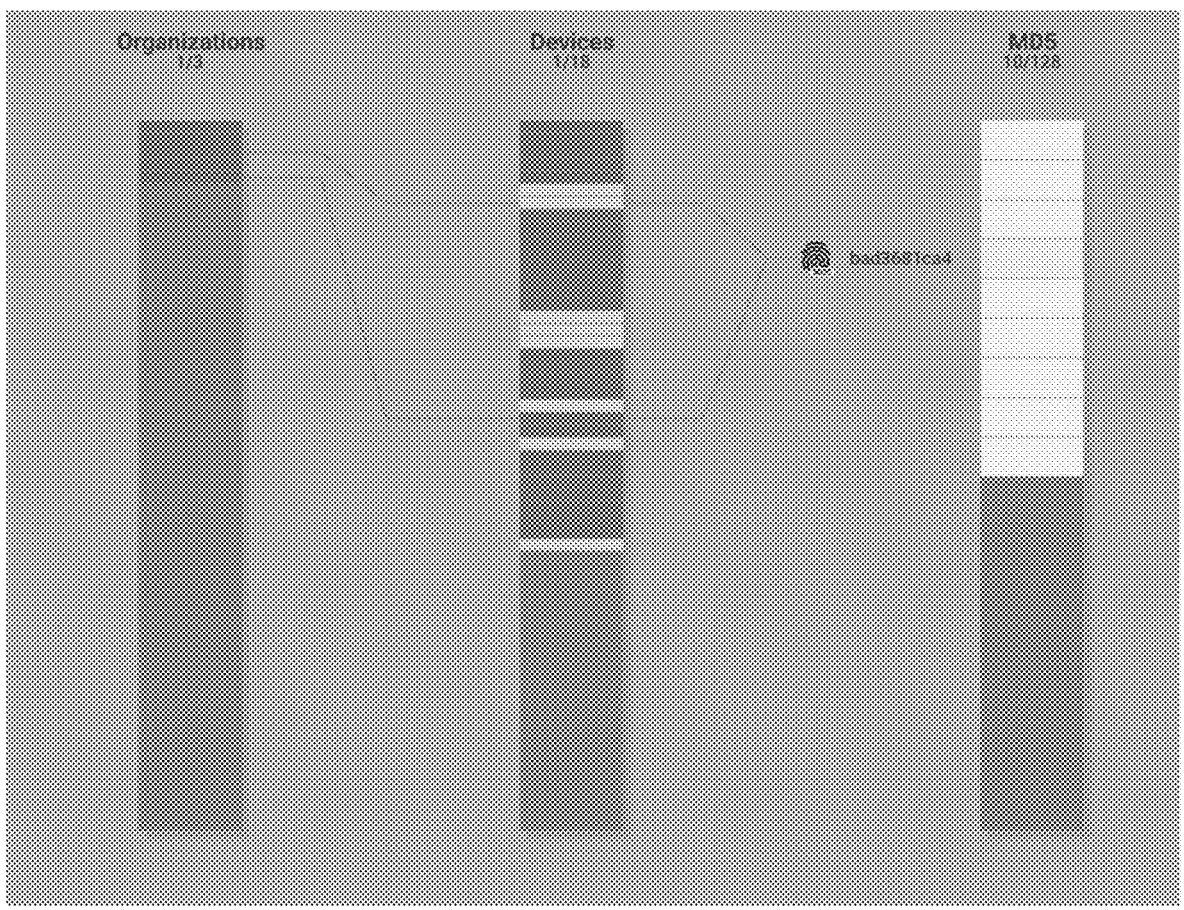
Figure 14:
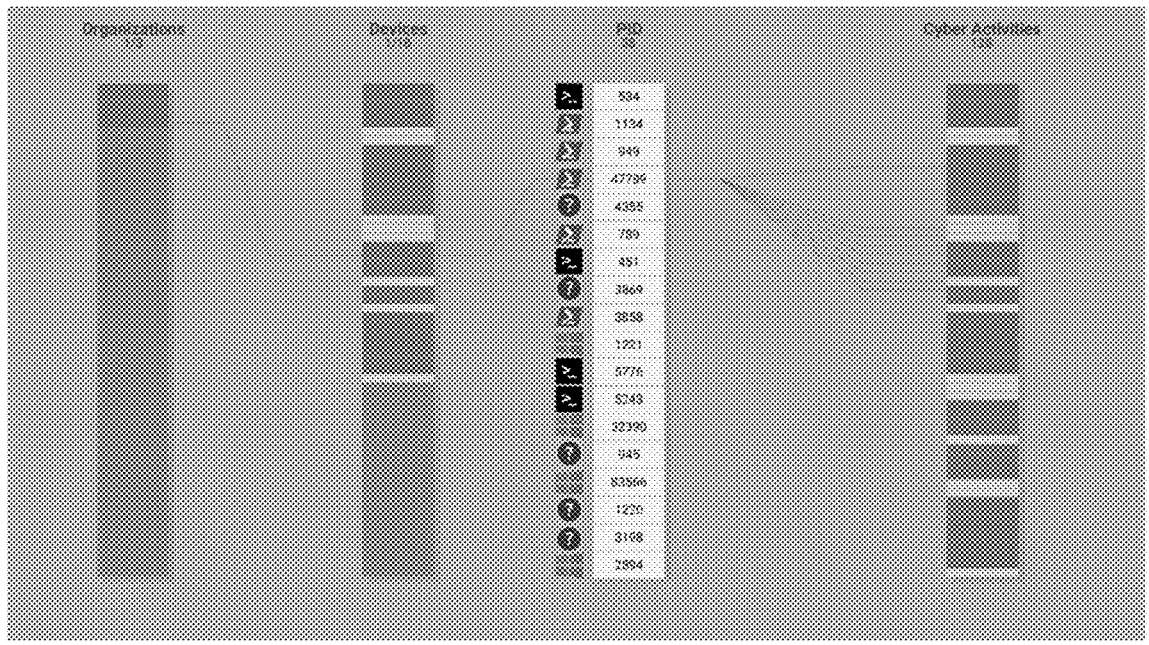
FIGS. 14 and 15, illustrates the 'integration' of one type of entity stack to produce another type of entity stack.
Figure 15:
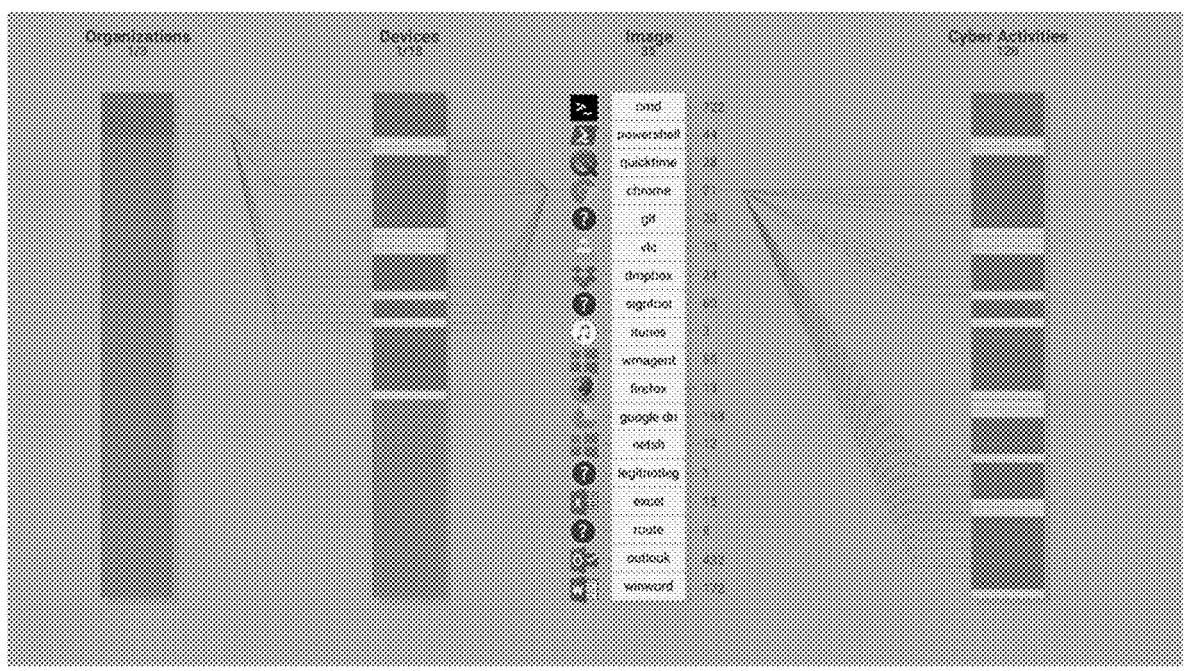

The present invention pertains to systems and methods for visually representing and relating cyber-activities. The methods and system of the present invention provide human and artificial intelligence based cyber operators visually recognizable, distinct patterns that simplifies and speeds up the identification and classification of normal versus anomalous behavior, both malicious and benign.

In certain embodiments the methods of the present invention extract and/or build one or more entities and one or more entity-relations from tracked cyber-activities derived from event streams to create the visualization models. In certain embodiments, the method for visualization comprises a) tracking a selected cyber-activity from event stream (s); b) selecting entities from the cyber-activity; (c) selecting an entity-relations tracking model; and d) visualizing on a graphical user interface.

Event Stream

Event streams may include but are not limited to process creation, file creation, communication and process injection events, among many others. Each individual event stream may represent a single or multiple distinct types of cyber-activities. For example, a communication event can represent a network file sharing cyber-activity or a cyber-activity corresponding to a client browser "surfing" the internet.

Entities

As used herein, entities are the unique values for a parameter type, referred to as entity types, from a cyber-activity derived from one or more event streams. As an illustrative example, 'excel.exe' is an entity of type program 'image' derived from multiple types of event streams including the process creation event stream.

Event entities, extracted and/or built from the event streams, effectively and comprehensively track key cyber-activity behavior. Each individual event stream is parsed and enriched to produce cyber-activity based entities required to monitor the targeted behavior for each individual type of cyber-activity.

For example, the event stream associated with public communications to the Internet has a 'destination IP' entity that can be enriched to create the following entities for this type of cyber-activity: ASN Organization, country code and geo-coordinates. In this case, these 'derived' entities provide different levels of granularity for which this type of cyber-activity can be tracked. In particular, this cyber-activity can be tracked across the physical space domain, with the entity geo-coordinates providing the finest grained level of monitoring and the country code the coarsest level of monitoring for this domain.

Entity-Relations Tracking Model

The entity-relations tracking model is chosen such that key questions can be deterministically answered. The selection of entities and entity-relations can also determine the level of granularity of the visual monitoring model.

For example, if the execution of all programs is to be tracked, the program image as an entity to be track is selected. If visualization at a more granular level of what program has executed on which machine is desired then the device as a tracked entity is selected and the entity-relation 'device-image' is selected to track in order to provide the required level of granularity for monitoring.

Similarly, if it is desired to track all the cyber-activities at the individual process level the 'process Id' (PID) must be tracked as an entity across multiple event streams. Likewise, if only 'destination IP' addresses is tracked without any entity-relations the origins of the connection to the IP address cannot be known. However, if the entity-relations: 'image-destination IP' and 'device-destination IP' are tracked, there is sufficiently granular information to know exactly which devices connected to this IP address and what program(s) performed the communication to the target 'destination IP'.

In certain embodiments, the tracking model is to be time-based. For example, if it is desired to track every single cyber-activity performed by a given process a full timeline tracking model must be selected such that each individual entity and entity-relation occurrence is tracked with respect to time. Alternatively, if only a statistical view of cyber-activities for a given process execution is required, then a time based model for which only a subset of all occurrences is explicitly tracked along with a statistical representation of all occurrences, such as, among other models, the tracking of the first occurrence, the last occurrence and the number of occurrences for entities and the entity-relations is selected.

Using such a tracking model the cyber-activities related to a specific process execution PID can be represented as an ordered sequence of distinct statistical summaries for each distinct entity-relation of type PID-'tracked entity', where the 'tracked entity' can be derived from any event stream that tracks the PID entity. The time sequence can be ordered using either the date time from the first occurrence parameter or from the last occurrence parameter. Each distinct ordered visual representation presents different information. For example, in order to know the first cyber-activity performed by a process the time sequenced summaries of the cyber-activities can be displayed using the first occurrence parameters. Similarly, to know what was the last cyber-activity that the process performed before terminating then the last seen parameter is used to present the time sequenced cyber-activities, entities and the entity-relations summaries.

Visualization

For each cyber-activity, entity, and/or entity-relation a graphical representation and/or textual representation is selected for the visualization on a graphical user interface (GUI). In certain embodiments, the visual representations comprise one or more graphical components including but not limited to iconographic and text based representations.

For each individual cyber-activity type a distinct iconographic and/or textual representation for the cyber-activity type is selected. For example, a cloud icon optionally with the text "http(s)" can represent the cyber-activity of "surfing" the Internet with a web-browser. The selected iconography and textual descriptors are selected such that they can represent all the possible cyber-activities being tracked from the selected set of event streams.

The text may be in the form of one or more labels or tags. Optionally, the text is displayed in response to a user's action. For example, the text may be displayed in response to the user "clicking" or "hovering over" the graphical representation. In certain embodiments, the one or more visual representations may be modified in response to user action. Optionally, text is used to provide further information.

In certain embodiments, the GUI is in a multiple panel format. The various panels of the multiple panel format may be used to display different visualization models, different levels of granularity, different levels of processing, and/or other information. In certain embodiments, the one or more panels are linked such that a user action in one panel is reflected in one or more other panels.

In certain embodiments, the multi-panel format includes a decision panel that implements a "Universal Workflow" for the monitoring of selected cyber-activities. The decision panel provides a graphical interface from where the cyber operator can select entities and entity-relations to annotate. In certain embodiments, the "Universal Workflow" prompts the cyber operator to annotate each new unique entity and entity-relation occurrence. In certain embodiments, the annotation comprises at a minimum, a score, message and the author identification.

In certain embodiments, the multiple panel format comprises a panel providing visual representations of unprocessed, cyber-activities, entities and/or entity-relations for tracked cyber-activities and a panel providing visual representations of processed cyber-activities, entities and entity-relations for tracked cyber-activities. In certain embodiments, only processed cyber-activities, entities and/or entity-relations for tracked cyber-activities requiring further analysis or action are visualized in the processed panel. As used herein, processing includes but is not limited to processing through the application of one or more rules to determine if the cyber-activities, entities and/or entity-relations for tracked cyber-activities is normal and can be ignored/suppressed, abnormal which requires further action or unknown which requires further analysis.

In certain embodiments, the methods also provide for the generation of rules for monitoring and/or alert analysis. Accordingly, in certain embodiments, the GUI provides a visual representation of the rules that have been applied and/or a section for rules generation/application. In specific embodiments, the GUI is in a multiple panel format and comprises one or more panels relating to rules, including for example a panel depicting rules applied and/or a panel for the rules generation.

The system and methods of the present invention utilize one or more visualization models. One of the visualizations models is a time based sequenced "tree" representation for cyber-activities, entities and/or entity-relations for tracked cyber-activities while another is a multi-relational stack representation for cyber-activities, entities and/or entity-relations for tracked cyber-activities. These representations can be used independently or synergistically to provide in-depth quantitative context for cyber-activities.

In certain embodiments, a time based sequenced "tree" representation is used to represent the tracked entities and entity-relations for cyber-activities selected from the event stream. In this visualization a "root" tracking entity type is selected for which a chronologically ordered sequence of entity-relations is represented, optionally on a straight cartesian line, starting from an occurrence of the "root" entity type, using one or multiple visual representation for the entity-relations including, but not limited to, its iconographic and/or textual representation(s). The use of cartesian representation maximizes the utilisation of visual real estate on the GUI.

In certain embodiments, the spacing between of the entity-relations represents the actual time axis. In other embodiments, a "Universal Timeline" is used that spaces out the entity-relations such that all entity-relations are equally spaced. In specific embodiments, when multiple of these entity-relations "Universal Timeline" are stacked together a cartesian grid is formed. If occurrences of the selected "root" entity type has relations to other occurrences of the "root" entity type then the visualization will use a visual 'branch' model to start up another "Universal Timeline" for the sub-branch of entity-relation. This sub-branch structure can re-occur at any level and location in the visualization if there are additional entity-relations between the root entity type.

For example, if the selected events streams includes process creation, file creation, and process injection, among others, the tracked entities includes the entity types 'PID', 'image', 'target file', and 'target image', among others, the tracked entity-relations includes 'image-PID', 'PID-target file', and 'image-target file', among others, and the tracking model is fulltime line, then the visualization represent the full process tree for each process execution occurrence. The branching corresponds to the cyber-activity of a parent process spawning a child process, where the sub-branch corresponds to the child's full process execution history, i.e. a complete history of all cyber-activities generated from the child process. If the tracking model only tracks the first occurrence, the last occurrence and the number of occurrences then the process "tree" collapses to a statistical representation of all cyber-activities summarized by entity-relations and ordered by the time parameter for the first occurrence or the last occurrence. The visualization can dynamically 'switch' between these time based tracking models. Similarly, this visualization can be used on any other entity type and entity-relations across any type of event streams.

In certain embodiments, the visualization models is based on relational stack representations. A "stack" is a structure, optionally vertical, comprising individual cells, which are also referred to as "chips", that are stacked, optionally one on top of another, where each individual cell represents an entity derived from cyber-activities from event stream(s). Each stack represents a specific type of tracked entity, or a group of entity types or cyber-activities.

For example, from the process creation event stream derived entities can produce a multi-stacks representation, where each individual stack represents one of the following entities: organization, domain, user and device. The entity-relations between these various stacks enable a multitude of orderings as long as each of the entity based stacks has entity-relations with its nearest neighbors, then the relational stack model can be represented visually implemented using connectors between cells along with informational decorators on the connectors to provide contextual information between stacks, such as the number of connections, among others. This model enables the full linking of all the cells in each stacks to cell(s) in the nearest stack(s), which in turn enables the visualization of all relations across all entities simultaneously.

The patterns produced by linking cells between entity stacks produces a series 1-to-N independent relations to nearest neighbor cells. These entity-relations represented through connectors in the relational stack representation can enable a multitude of questions to be answered. For example, using the following entity stack ordering: organization, devices, hashes, a cyber operator can visually identify which devices has been infected by a specific malicious hash and what organization have been affected by the infection. Similarly, this relational stack representation can be used to track the patching of software on devices by tracking the propagation of the device-hash relation, which is visually represented by connectors between the device based cell stacks and the hash based cell stack. Moreover, the patterns produced by both of these use cases are sufficiently distinct to enables the visual identification of the propagation of a new patch versus the normal propagation of malware and/or use of unauthorized software.

In certain embodiments, each cell in a stack is visually represented by a general cartesian rectangle, which can be dynamically expanded, and compressed down to a single pixel in either height and/or width. In certain embodiments, each cell has a color coding that represents an entity type or value 'type' and can also contain text based information that, optionally is only revealed when the cell is sufficiently expanded. In certain embodiments, the cell has an iconographic and/or textual representation of the cyber-activity or entity it represents, which is visually presented, optionally in response to user input, to the left or right of the cell's rectangle. In certain embodiments, this visual component can be 'pulled' out of the cell or 'pushed' back in to minimize the over real estate used by the GUI. In certain embodiments, the cell also contains information components that can presented using a pop-up, which can dynamically reveal different pieces of information, including but not limited to the number of connectors to the right and the number of connectors to the left, along with summaries of the values of the entity-relations with the nearest neighbor stack of cells to the left and/or right.

In certain embodiments, the stacks can also perform 'integration' for certain types of entity stacks to produce a new entity stack. For example, a process entity stack can be 'integrated' over the process PI Ds in order to produce a program image entity stack. This type of transformation enables a user to quickly recognize the normal patterns of behavior for any given program image across a large number of process executions. In certain embodiments, each of the stacks can be sorted by entity values, time, or any other available parameter. In certain embodiments, each of the stacks can be filtered by entity values, time, and/or any other available parameter.

In certain embodiments, a number of elements, either entities and/or cyber-activities, are displayed in the stack and optionally are stored in a buffer/queue at the 'top' and 'bottom' of the stack with a textual representation of the number of elements in each of the buffer/queue. In embodiments where the monitoring is for a particular time period, the time period may be actual time or based on a certain number of elements. The time periods may be scheduled time periods or may be started and stopped in response to a user's action. For example, the duration of the period may be of any duration including, but not limited to, one hour, one day, one week, one year or any number of distinct elements including but not limited to 50, 100, 200, etc. Optionally, the methods and system of the present invention, include a record of the number of elements and optionally visually displays a number count.

In certain embodiments, time period, when completed, are archived. In certain embodiments, the monitoring is ongoing.

In addition, these visualization models can contain informational details with respect to specific elements, such as cyber-activities, an entities and/or an entity-relations, that may be displayed as a pop-up in response to a user controlled action. In certain embodiments, the visual representations of specific elements, such as cyber-activities, entities and entity-relations, is comprised of one or more graphical components which can be iconographic and text based. Optionally, specific components can be displayed in response to a user's action, such as on hover over present a text based summary of the element, among other possibilities. For example, a text based component may be displayed in response to the user "clicking" on the iconographic representation of the element. In certain embodiments, one or more visual components may be modified in response to user action.

In certain embodiments, the GUI is in a multiple panel format and comprises a panel providing visual representations of unprocessed cyber-activities, entities and/or entity-relations, and a panel providing visual representations of processed cyber-activities, entities and/or entity-relations. In certain embodiments, only processed cyber-activities, entities and/or entity-relations requiring further analysis or action are visualized in the processed panel. As used herein, processing includes but is not limited to processing cyber-activities, entities and/or entity-relations through the application of one or more rules to determine if the cyber-activities, entities and/or entity-relations is normal and can be ignored/suppressed, abnormal which requires further action or unknown which requires further analysis.

The methods of the present invention, also provides for the generation of rules for monitoring cyber-activities, entities and/or entity-relations. Accordingly, in certain embodiments, the GUI provides a visual representation of the rules that have been applied and/or a section for rules generation for cyber-activities, entities and/or entity-relations. In specific embodiments, the GUI is in a multiple panel format and comprises one or more panels relating to rules, including for example a panel depicting rules application and/or a panel for the rules generation. The rules enable the automated processing of cyber-activities, entities and/or entity-relations from the 'unprocessed' panel to the 'processed' panel. This process visually depicts the digital workflow that cyber operator can implement using the methods and system described in this application.

In certain embodiments, the tracked cyber-activities can include but are not limited to the creation, modification or deletion of files; the creation, modification or deletion of a registry keys and values; the creation, modification or deletion of a windows management instrumentation class and instance; network communications including connections to both public and private, among other measurable cyber-activities. The tracking of these cyber-activities along with the tracking of selected entities and entity-relations provide cyber operators with the monitoring required to track the following set of actions:

1. Attached Word document is opened from an email received in Outlook; the attached document starts up a VBA macros that spawns an instance of PowerShell; the instance of PowerShell connects to a public IP address and downloads a malicious piece of software.
2. Excel spreadsheet is opened up from a USB key; excel spreadsheet starts up VBA macro that sets an 'auto-start' registry key with a value corresponding to a PowerShell execution command; at machine restart the 'auto-start' registry key enables the execution of the PowerShell command; PowerShell connects to a public IP address and downloads a malicious piece of software.
3. User downloads from the Internet a zip file; user unzips the files in a new folder which includes an executable file; user manually executes the executable file.

In certain embodiments, the graphical components for the cyber-activities, entities and entity-relations include text. This text may be in the form of one or more labels or tags providing further information. Optionally, the text is displayed in response to a user's action. For example, the text may be displayed in response to the user "clicking" or "hovering over" a graphical component of the representation.

In certain embodiments time based ordered visual representations may be paused, "rewound" and/or "fast forwarded" in response to a user action or at a scheduled timepoint. Optionally, the methods and system of the present invention provides search option to search cyber-activities, entities and entity-relations and/or a filter option such that only certain elements can be selected and displayed.

The cyber-activities, entities and entity-relations may be displayed automatically or in response to a user's actions. All cyber-activities, entities and/or entity-relations or selection of the cyber-activities, entities and entity-relations may be displayed. Accordingly, in certain embodiments, methods for filtering cyber-activities, entities and entity-relations utilize one or more criteria. The filtering may comprise inclusion filtering such that cyber-activities, entities and/or entity-relations meeting the one or more inclusion filtering criteria are displayed. The filtering may also comprise of exclusion filtering such that cyber-activities, entities and/or entity-relations meeting one or more exclusion filtering criteria are not displayed. Criteria may include but is not limited to any key-value pair(s) contained in the cyber-activities, entities and/or entity-relations. For example, this can include a particular user account, a particular device, and/or a particular organization, among other possibilities.

In certain embodiments, the methods of the present invention depict cyber-activities, entities and/or entity-relations at one or more levels of granularity. These levels of granularity include but are not limited to the cyber operator level, organizational level, domain level, site level, network level, sub-network level, group asset level, device level, user level, operating system level, and process level, among others. In specific embodiments, the method of the present invention displays cyber-activities, entities and/or entity-relations in hierarchy comprising the following levels: operators, clients, devices, processes and events. A panel may depict one or multiple levels of granularity.

The following example of a cyber-activity at various granularity levels for a registry key modification in device #5 in network #2 of organization A is provided as a non-limiting illustrative example only:

Network level: The method would provide a visualization of the cyber-activity in network #2 of organization A.
Device level: The method would provide a visualization of the cyber-activity in device #5 in network #2 of organization A.
Event level: The method would provide a visualization of the cyber-activity of a registry key modification in device #5 in network #2 of organization A.

The method further comprises, optionally displaying, optionally in response to a user action, a link/pathway to a selected cyber-activity, entity and/or entity-relation in each of level of granularity; and optionally displaying, optionally in response to a user action, on said graphical user interface, a graphical representation(s) of the time based sequenced "tree" representation of the cyber-activity, entity and/or entity-relation.

In certain embodiments, the methods further comprise characterizing each cyber-activity, entity and/or entity-relation as normal or anomalous based on a cyber operator annotation and/or cyber operator defined rule and/or its statistical deviation from the normal baseline. Optionally, when an anomalous cyber-activity, entity and/or entity-relation has been identified, the method of the present invention initiates downstream actions, including but not limited to automatic notifications and/or automatic countermeasures.

In specific embodiments, the selected event streams produced by the deployed sensors across the computer and computer network can be adjusted to increase or decrease the level granularity for the monitored event streams. Increased visibility can also be achieved by starting up new event streams to achieve finer grained monitoring of cyber-activities. For example, when a network is actively under attack by an adversary the cyber operator can increase the visibility of the monitoring by changing the configuration of event streams and by starting up new event streams. In particular, the cyber operator may choose to remove all filters on the 'process creation' event stream, to have complete visibility into this event stream, and to start up the 'module loaded' event stream to track all modules loaded into process memory space. This can enable to track behavior, such as libraries loading into a running process, which can provide the insight required to track the adversaries behaviour.

Although the invention has been described with reference to certain specific embodiments, various modifications thereof will be apparent to those skilled in the art without departing from the spirit and scope of the invention. All such modifications as would be apparent to one skilled in the art are intended to be included within the scope of the following claims.

The embodiments of the invention in which an exclusive property or privilege is claimed are defined as follows:

1. A method for cyber-monitoring and visually depicting cyber-activities, said method comprising:
   a) tracking cyber-activities derived from event stream(s);
   b) extracting, building or extracting and building one or more entities and one or more entity-relations from said tracked cyber-activities, wherein each of said entity is a representative component of a particular cyber-activity;
   c) displaying on a first panel of a graphical user interface (GUI) having a multiple panel format a set of relational stack representations where each stack represents a different level of granularity; each stack comprising cells in a chronological order, where each cell represents an entity from the one or more entities of b); and wherein each cell comprises information regarding the entity the cell represents that can be visualized in response to user input;
   d) selecting an entity to visualize across levels of granularity;
   e) displaying, automatically or in response to a user action, links between the selected entity in neighboring stacks to provide a pathway following the selected entity across levels of granularity and thereby produce a pattern of relations for said selected entity across said levels of granularity;
   f) characterizing said selected entity as normal or anomalous based on said pattern of relations for said selected entity across said levels of granularity; and
   g) displaying on a second panel of said GUI a further relational set of stack representations having the same levels of granularity; each stack comprising cells in a chronological order, where each cell represents an entity characterized in step f) as anomalous which requires further analysis; and wherein each cell comprises information regarding the entity the cell represents that can be visualized in response to user input.

2. The method of claim 1, wherein each cell can be expanded or compressed.

3. The method of claim 1, wherein each cell has color coding.

4. The method of claim 1, wherein (b) comprises:
   (i) selecting entities from said cyber-activity(ies) and
   (ii) selecting entity-relations tracking model.

5. The method of claim 1, wherein said relational stack representations comprise stacks representing entities at organization, domain, user and device levels of granularity.

6. The method of claim 1, wherein said relational stack representations comprise stacks representing entities at devices, processes and events levels of granularity.

7. The method of claim 1, wherein one or more panels of the GUI are linked such that user action in one panel is reflected in one or more other panels.

8. The method of claim 7, wherein said GUI further comprises a third panel, and the method further includes displaying a tree representation of said one or more entities in the third panel.

9. The method of claim 7, wherein said GUI comprises one or more panels providing a visualization of rules for automated processing or rules generation.

10. The method of claim 7, wherein said GUI comprises a panel for implementing a workflow.

11. The method of claim 1, wherein characterization as normal or anomalous is automatic based on rules.

12. The method of claim 1, further comprising initiating downstream actions following characterization of an entity as anomalous.

13. The method of claim 12, wherein said initiating downstream actions is automatic.

* * * * *